United States Patent [19]
Shaffer

[11] Patent Number: 5,793,414
[45] Date of Patent: Aug. 11, 1998

[54] INTERACTIVE VIDEO COMMUNICATION SYSTEM

[75] Inventor: Stephen L. Shaffer, Penfield, N.Y.

[73] Assignee: Eastman Kodak Company, Rochester, N.Y.

[21] Appl. No.: 559,388

[22] Filed: Nov. 15, 1995

[51] Int. Cl.$^6$ ............................... H04N 7/16; H04N 7/14
[52] U.S. Cl. .................. 348/13; 348/8; 348/12; 348/10; 455/6.3
[58] Field of Search .................. 348/13, 7, 12, 348/10, 8, 6; 455/6.2, 6.3; H04N 7/10, 7/14

[56] References Cited

U.S. PATENT DOCUMENTS

| | | | |
|---|---|---|---|
| 3,730,986 | 5/1973 | Morchand | 178/5 |
| 3,982,065 | 9/1976 | Barnaby et al. | 178/5.8 R |
| 4,611,227 | 9/1986 | Brockhurst et al. | 358/147 |
| 4,679,082 | 7/1987 | Shibasaki | 358/147 |
| 4,891,633 | 1/1990 | Imazeki et al. | 348/12 |
| 5,060,165 | 10/1991 | Schumacher et al. | 364/478 |
| 5,140,435 | 8/1992 | Suzuki et al. | 358/335 |
| 5,414,773 | 5/1995 | Handelman | 348/10 |
| 5,461,701 | 10/1995 | Voth | 395/101 |
| 5,561,708 | 10/1996 | Remillard | 348/7 |
| 5,572,442 | 11/1996 | Schulhof et al. | 364/514 |

OTHER PUBLICATIONS

H.G.Brown, C.D.O'Brien, W.Sawchuk, J.Storey & R.Marsh, "Comparative Terminal Realizations with Alpha–Geometric Coding", *IEEE Transactions on Consumer Electronics*, vol. CE–26, Aug. 1980, pp. 605–615.

B.Norris & B.Parsons, "Teletext Data Decoding–The LSI Approach", 1976, *Consumer Electronics*, vol. CE–22, No. 3, pp. 247–252.

J.W.Hughes, "Videotex and Teletext Systems", *Computer Design*, vol. 18, No. 10, 1979, pp. 10–23.

E.Insam & L.J.Stagg, "An Integrated Teletext and Viewdata Receiver", *The SERT Journal*, vol. 11, 1977, pp. 210–213.

S.Ditlea, "Interactive Illusion", *UPSIDE*, Mar. 1995, pp. 56–68.

M.Ratcliffe, "Reach Out and Entertain Someone", *Digital Media*, vol. 4, No. 8, Jan. 1995, pp. 7–17.

*Primary Examiner*—Mark R. Powell
*Assistant Examiner*—Vivek Srivastava
*Attorney, Agent, or Firm*—Thomas H. Close

[57] ABSTRACT

An interactive video communication system, includes a bi-directional communication channel; a central information facility connected to the communication channel; an interactive information database associated with the central information facility containing video programming material with imbedded references to high resolution digital images selectable by a system user; a data base containing the referenced high resolution digital images; a printer processor for converting a viewer selected high resolution image to control signals for printing the image on a system user's dumb color printer; and a population of system users, each having a transceiver connected to the communication channel, a video display connected to the transceiver for displaying video programming material received from the central information facility, a dumb color printer for printing high resolution color images received by the transceiver from the central information facility, and a controller for selecting high resolution digital images referenced in the programming material.

5 Claims, 3 Drawing Sheets

INTERACTIVE VIDEO COMMUNICATION SYSTEM

FIELD OF THE INVENTION

This invention relates generally to the field of television, and in particular to interactive television systems having associated hard copy printing capability.

BACKGROUND OF THE INVENTION

For many years systems have been designed to transmit encoded data via a transmission channel. Systems such as the Teletext, Viewdata, Videotex, ANTILOPE, and Telidon all provide techniques for transmitting textual and primitive graphic data to low cost receivers for display on a standard television. These early systems rely upon specialized circuit designs and limitations on capabilities to keep the cost of receivers low.

Recent advances in microprocessor speed and computing power, combined with significant advances in digital electronic manufacturing capabilities have combined to create a variety of consumer electronics capabilities. In addition, with advances in digital signal processing and networking capabilities, many cable and telephone companies have begun to install digital networking infrastructures to homes. Using advanced data encoding techniques such as MPEG2 and ATM, these digital networks can be used for a variety of purposes, but in particular several companies have been experimenting with advanced television systems referred to in general as interactive TV.

These trials employ very expensive network connections to the home, and set-top-box signal decoders which can cost over $5,000; $1,000–$1,500 per household for network upgrades, and $300–$400 per household for a color printer. These costs are clearly prohibitive and limit the deployment of such capabilities into the broad consumer markets. It is projected that the cost of the combined set-top-box and printer would need to be reduced to approximately $300 per household before such a system will become economically feasible. Although the proposed Interactive TV systems differ as to the specific programming and service offerings which are provided to the consumer, many of the services can be grouped into four classes of capability: movies, games, shopping, information.

Movies are provided on demand complete with the consumer's ability to pause, fast forward and rewind. Games can be provided where the consumer interacts with others in the community or the game software can be downloaded to a special game computer device in the home. Interactive shopping allows consumers to browse, view, and order items from a collection of vendors without leaving their home. And finally, information services allow consumers to browse through many sources of on-line databases using their remote control. All of these services present the majority of the information to the computer screen for temporary viewing. In some cases a receipt printer is provided to document a shopping transaction or to print coupons in the home.

There are many situations which would benefit from the capability to provide a high (photographic) quality, page-size print. These high quality prints could be of a favorite TV character, a particular scene from a movie, or a high-quality catalog page to assist the user in making a purchasing decision. In all of these situations the quality of the print is a significant factor in the decision to purchase.

There are many factors which contribute to the quality of a print, the most significant of which are: 1) the resolution addressibility of the printer; 2) the ability to represent variable reflection densities; 3) the preparation of the data sent to the printer; and 4) the quality of the paper/carrier. A printer device consists of three main subsystem components: data memory, signal processor, and the print mechanism. In general the quality of a print increases with the amount of data which is used in the printing process and the resolution capability of the printer.

Because of the variety of printing devices which exist, each of which employs a distinct marking method, data is generally sent to the printer in a generic or common format. This allows the computer and software manufacturer to support a variety of printing devices, but it also means that each printing device must contain the capability of translating the generically encoded image data into the unique signals necessary to drive the printing mechanism specific to the printer. This translation is the role of the signal processor and data memory or raster image processor (RIP).

Since a high quality print requires a large amount of data, high quality printers require powerful signal processing capability and large data memories, which are relatively expensive components in the cost of a printing device. As has been noted, the costs associated with providing broad band digital network connections, and digital set-top-boxes with printers is generally very expensive and it will be a challenge to reduce these costs.

SUMMARY OF THE INVENTION

The present invention is directed to overcoming one or more of the problems set forth above. Briefly summarized, according to one aspect of the present invention, an interactive video communication system includes a bi-directional communication channel; a central information facility connected to the communication channel; an interactive information database associated with the central information facility containing video programming material with imbedded references to high resolution digital images selectable by a system user; a database containing the referenced high resolution digital images; a printer processor for converting a viewer selected high resolution image to control signals for printing the image on a system users dumb color printer; and a population of system users, each having a transceiver connected to the communication channel, a video display connected to the transceiver for displaying video programming material received from the central information facility, a dumb color printer for printing high resolution color images received by the transceiver from the central information facility, and a controller for selecting high resolution digital images referenced in the programming material.

An advantage of the present invention is that the image rendering equipment is located in a shared central facility, thereby saving the expense of including image rendering capability with each printer. Another advantage is that the system user's printer may be changed without the need to reprocess the images in the interactive database to account for differences in printer performance, resolution, color capability, or manufacturer's variability.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
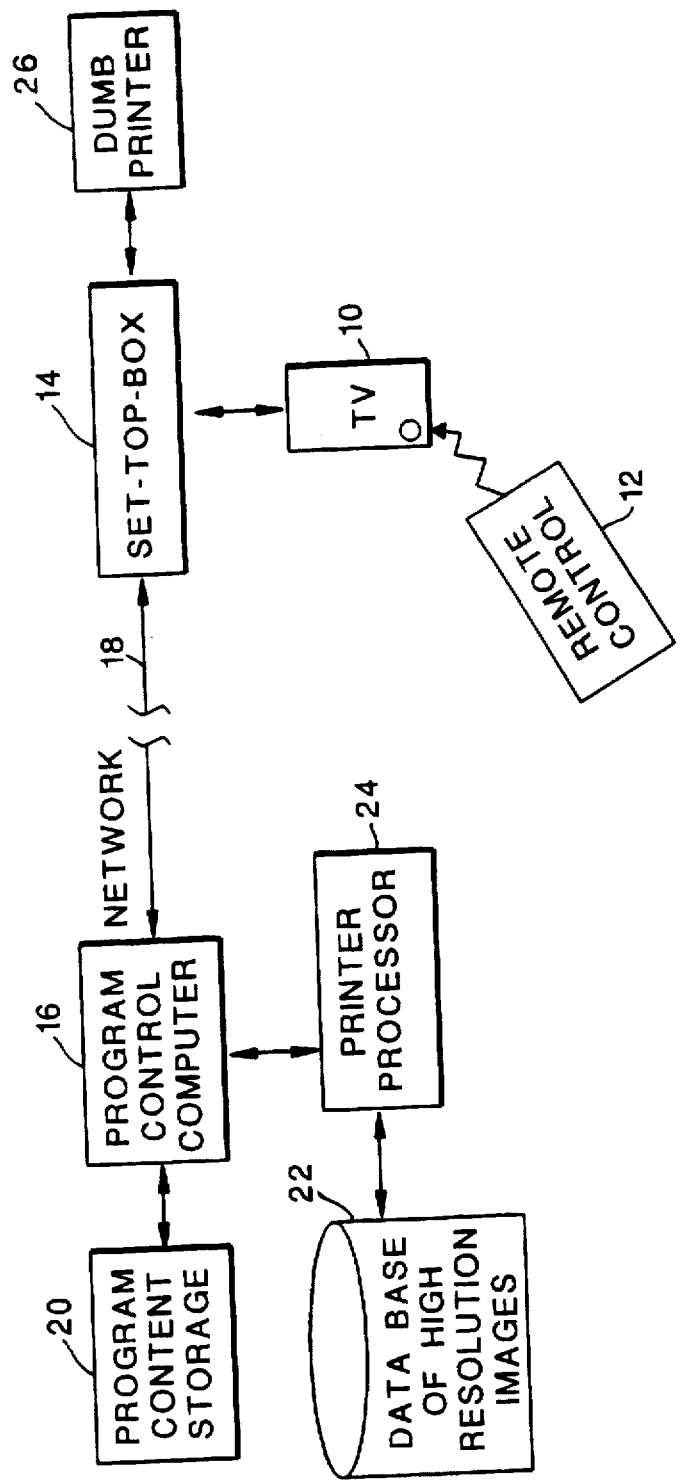
FIG. 1 is a schematic diagram illustrating an interactive video communication system according to the present invention.

Referring to FIG. 1, a user viewing television device 10 selects an interactive channel using remote control 12 which communicates to a set-top-box 14. The set-top-box 14 tunes to the requested channel and signals the program control computer 16 using network connection 18. The program control computer 16 accesses the program material associated with the selected channel from the program content storage 20 and begins to transmit the video content to set-top-box 14 for display on television 10 using network connection 18. In preselected portions of the program material which is displayed on the users television 10, a graphic user interface containing a control button or menu selection is displayed to the user which allows the user to select the option of generating a hard copy print of specific material. The user, using remote control 12 selects the print option. The selection request signal is sent from the set-top-box 14 over network 18 to the program control computer 16.

Program control computer 16 recognizes the request for a hard copy print and retrieves the image data to be printed from a high resolution image storage means 22, such as an optical disc library, or magnetic disc array, processes the image data according to the users printer in printer processor 24. The image storage means 22 may be located at the same facility as the program controller, or may be located remotely therefrom and accessed by the program controller over a communictions network. The printer characteristics include for example, output size, printer resolution, printer color space, printer color gamut, printer calibration, designation of a preferred halftone algorithm, and number of bits per pixel per color. The images in storage means 22 are stored in a known color space such as PhotoYCC having downsampled chrominance channels (CC) and are compressed using a standard compression technique such as JPEG compression. Printer processor 24 contains a table of printer characteristics for each printer on the network. The printer processor retrieves the printer characteristics for the particular printer using the address of the set-top-box. The printer characteristic table is generated and updated by the network provider whenever a new printer is added to the system. The processed image data is then returned to the program controller 16. Program controller 16 assigns a digital channel for the transmission of the printer data and sends the channel assignment to the set-top-box 14. The program controller 16 then begins to transmit the printer ready data in blocks to a dumb printer 26 using network connection 18 and set-top-box 14.

Figure 2:
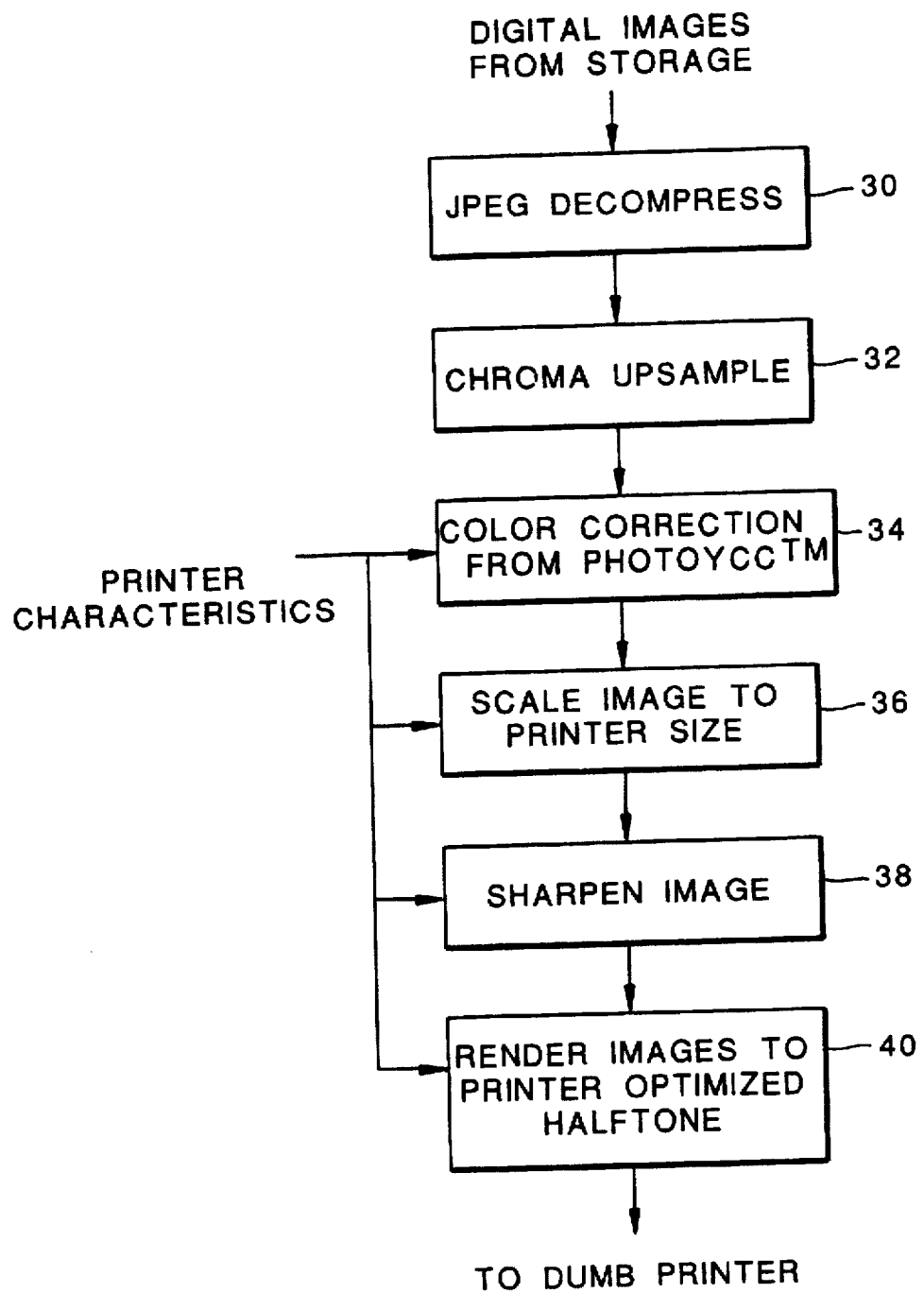
FIG. 2 is a flow chart illustrating digital image processing employed by the printer processor in the present invention.

The operations performed by the printer processor 24 to prepare the digital image data for printing on dumb printer 26 will now be described with reference to FIG. 2. To utilize the stored compressed image, JPEG decompression is applied 30 to reverse the effects of the JPEG compression. The chrominance channels (CC) of the PhotoYCC color space are up sampled 32 to reverse the down sampling previously performed on these channels. Color correction is performed 34 to translate the encoded PhotoYCC color space image into the color space of the intended printer based upon the printer parameters provided from the table in the printer processor 24.

The image is then resized or scaled 36 to match the desired printers output size capability and the printers writing resolution (i.e. pixels per inch). The previous two steps are sometimes reversed to eliminate unnecessary pixel computations.

Image sharpening is generally performed 38 as one of the last steps in the processing chain to compensate for the printer's modulation transfer function (MTF). Alternately, this sharpening step may be performed prior to resizing to save processing time if significant enlargement is requested and the resulting loss of image quality will not be objectionable.

Next, the image is rendered via a halftoning algorithm 40 in the printer processor 24 to reduce the number of bits per pixel per color to match bits per pixel capability of the destination dumb printer 26. This halftoning step is necessary if the printer is not capable of printing continuous tone color (e.g. 8 bits per pixel per color plane). The selection of the halftoning algorithm used is dependent upon the specifics of the destination printer. The optimization of this algorithm depends upon the size, shape, and addressibility of the printer device. The printer processor 24 selects the preferred algorithm among several depending upon the characteristics of the dumb printer 26.

Figure 3:
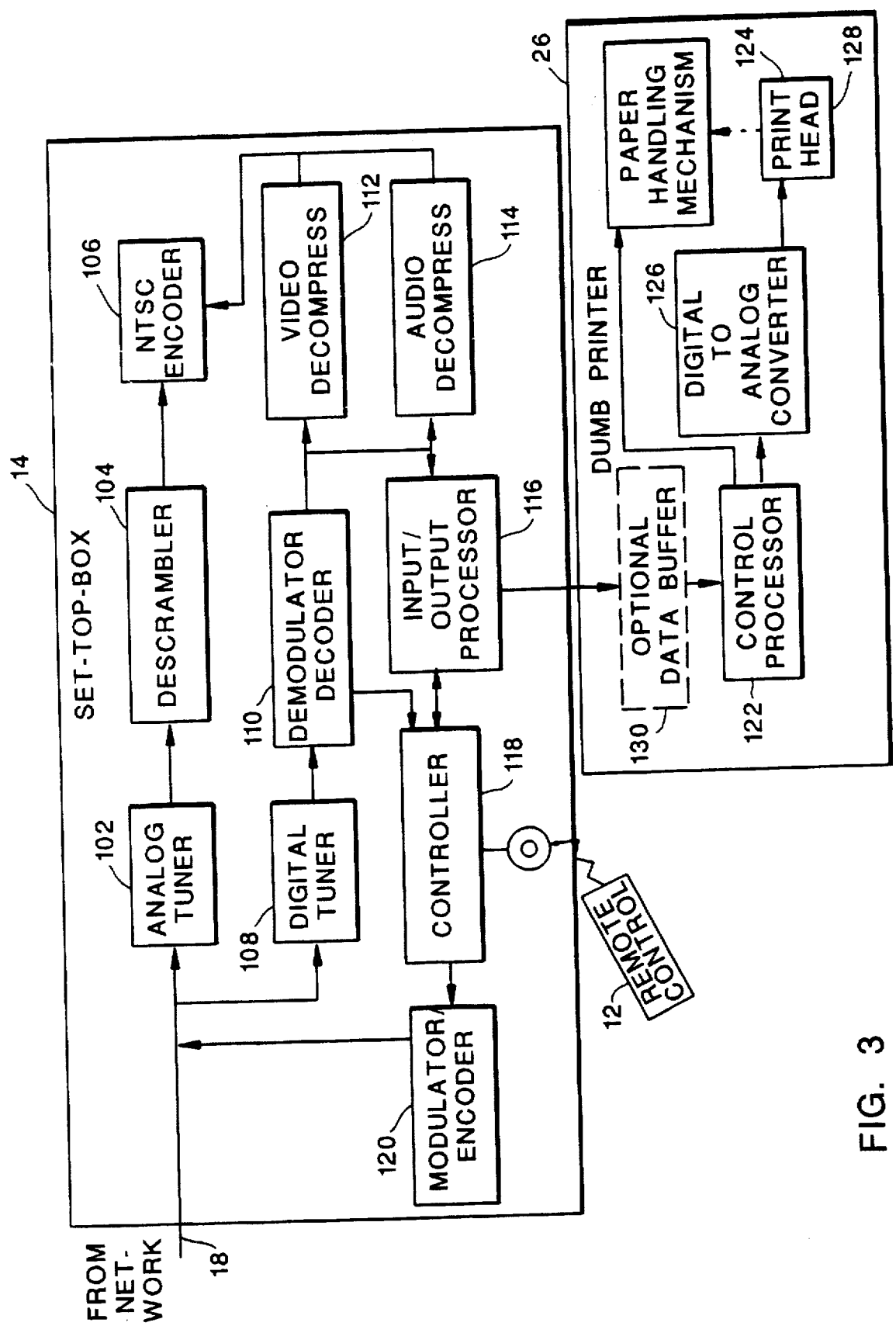
FIG. 3 is a schematic diagram of a set top box and color printer used in the communication system of the present invention.

The set-top-box connected to a printer according to the present invention will be described with reference to FIG. 3. The conventional set-top-box 14 includes an analog tuner 102, a descrambler 104, and an NTSC encoder 106 for receiving and displaying analog program material. The set-top-box also includes a digital tuner 108, a demodulator/decoder 110, a video decompressor 112, an audio decompressor 114, and input/output processor 116 for receiving and processing digitally encoded program material, supplying the processed program material to the NTSC encoder 106 or the dumb printer 26 connected to the set-top-box 14, and supplying control signals from the demodulator/decoder 110 to a controller 118. The controller 118 is also connected to the analog and digital tuners 102 and 108, and to a modulator/encoder 120 for controlling the receipt and transmission of information over the network and to input/output processor 116 for controlling transmission of printer ready data to the dumb printer 26. The controller 118 receives control signals from a user via remote control unit 12.

The dumb printer 26 according to the present invention includes a control processor 122 for controlling the operation of the dumb printer, a paper handling mechanism 124, a digital to analog converter 126, and a print head 128. It is assumed that the print head 128 includes the print media, such as an ink supply for an inkjet printer, thermal donor ribbon for a thermal printer, or toner for an electrographic printer.

Printer ready data is transmitted to the set-top-box 14 as digitally encoded channel data. The digital tuner 102 is tuned to the digital channel assigned by the program controller 16. An image to be printed is directed to the dumb printer 26 by controller 118 via input/output processor 116. The input/output processor 116 sends the printer ready data directly to the printer controller 122 which passes the data to the analog-to-digital converter 126. The analog signals from the analog to digital converter 126 are sent to print head 126.

Because the image data was rendered and processed by printer processor, there is no need for the dumb printer to incorporate a data buffer or a print rendering processor sometimes referred to as a raster image processor or RIP, thereby saving the expense of such electronics in the printer. Alternatively, a small, reduced size data buffer 130 may be included in the dumb printer to accommodate some flow control buffering in the system.

The invention has been described with reference to a preferred embodiment. However, it will be appreciated that variations and modifications can be effected by a person of ordinary skill in the art without departing from the scope of the invention.

| PARTS LIST | |
|---|---|
| 10 | TV |
| 12 | remote control |
| 14 | set-top-box |
| 16 | program control computer |
| 18 | network connection |
| 20 | program content storage |
| 22 | high resolution image storage |
| 24 | printer processor |
| 26 | dumb printer |
| 30 | JPEG decompression step |
| 32 | color space upsampling step |
| 34 | color correction step |
| 36 | image resizing step |
| 38 | image sharpening step |
| 40 | halftoning step |
| 102 | analog tuner |
| 104 | descrambler |
| 106 | NTSC encoder |
| 108 | digital tuner |
| 110 | demodulator/decoder |
| 112 | video decompressor |
| 114 | audio decompressor |
| 116 | input/output processor |
| 118 | controller |
| 120 | modulator/encoder |
| 122 | control processor |
| 124 | paper handling mechanism |
| 126 | digital to analog converter |
| 128 | print head |
| 130 | optional data buffer |

I claim:

1. An interactive video communication system, comprising:

a) a bi-directional communication channel;

b) a central information facility connected to the communication channel;

c) an interactive information database associated with the central information facility containing relatively low resolution video programming material with imbedded references to relatively high resolution color digital images selectable by a system user;

d) a data base associated with the central information facility containing the referenced relatively high resolution color digital images;

e) a printer processor associated with the central information facility for converting a viewer selected relatively high resolution color digital image to control signals for printing the image on a system user's dumb color printer; and f) a population of system users, each having a transceiver connected to the communication channel, a video display connected to the transceiver for displaying the relatively low resolution video programming material received from the central information facility, a dumb color printer for printing the relatively high resolution color images received by the transceiver from the central information facility, and a controller for selecting high resolution digital images referenced in the programming material.

2. The interactive video communication system claimed in claim 1, wherein the dumb printer comprises:

a) a control processor for controlling the printer;

b) a paper handling mechanism;

c) a digital to analog converter for receiving digital print signals from the control processor and producing analog print signals; and d) a print head connected to the digital to analog converter.

3. The interactive video communication system claimed in claim 2, wherein the dumb printer further comprises a data buffer.

4. The interactive video communication system claimed in claim 1, wherein the data base of referenced high resolution digital images is located remotely from the central information facility.

5. The interactive video communication system claimed in claim 1, wherein the printer processor includes a table containing characteristics of the system user's printers.

* * * * *